(12) United States Patent
Suzuki et al.

(10) Patent No.: US 7,153,568 B2
(45) Date of Patent: *Dec. 26, 2006

(54) OPTICAL FILM

(75) Inventors: Katsumi Suzuki, Ichihara (JP);
Fumiko Kawasato, Ichihara (JP); Ken Moriwaki, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/003,887

(22) Filed: Dec. 6, 2004

(65) Prior Publication Data

US 2005/0153117 A1    Jul. 14, 2005

Related U.S. Application Data

(62) Division of application No. 10/176,683, filed on Jun. 24, 2002.

(30) Foreign Application Priority Data

Jun. 25, 2001    (JP)    ............................... 2001-191632

(51) Int. Cl.
*B32B 27/08* (2006.01)
*B32B 27/20* (2006.01)
*B32B 27/40* (2006.01)

(52) U.S. Cl. .................. 428/336; 428/421; 428/423.1; 359/359; 359/885

(58) Field of Classification Search ................ 428/336, 428/411.1, 421, 423.1; 359/359, 885
See application file for complete search history.

(56) References Cited

U.S. PATENT DOCUMENTS

| | | | |
|---|---|---|---|
| 5,449,558 A | 9/1995 | Hasegawa et al. | 428/422 |
| 5,834,122 A | 11/1998 | Teng et al. | 428/412 |
| 6,165,546 A | 12/2000 | Teng et al. | 427/163.1 |
| 6,229,252 B1 | 5/2001 | Teng et al. | 313/112 |
| 6,255,031 B1 | 7/2001 | Yao et al. | 430/270.1 |
| 6,333,596 B1 | 12/2001 | Shim | 313/479 |
| 6,344,710 B1 | 2/2002 | Teng et al. | 313/479 |
| 6,452,331 B1 | 9/2002 | Sakurada et al. | 313/582 |
| 6,902,791 B1 * | 6/2005 | Kawasato et al. | 428/141 |

FOREIGN PATENT DOCUMENTS

| | | |
|---|---|---|
| EP | 0 894 620 A1 | 2/1999 |
| JP | 63-18964 | 4/1988 |
| JP | 63-238111 | 10/1988 |
| JP | 63-238115 | 10/1988 |
| JP | 10128898 | 5/1998 |
| JP | 10156991 | 6/1998 |
| JP | 10-219006 | 8/1998 |
| JP | 10227902 | 8/1998 |

(Continued)

OTHER PUBLICATIONS

Encyclopedia of Polymer Science and Engineering, vol. 4, p. 390, Jul. 1986.*

*Primary Examiner*—Ramsey Zacharia
(74) *Attorney, Agent, or Firm*—Oblon, Spivak, McClelland, Maier & Neustadt, P.C.

(57) ABSTRACT

An optical film which comprises a transparent resin layer (1) made of a photo-curable resin having a self-healing property, an antireflection layer (2) present on one side of the transparent resin layer (1), and a color tone correcting layer (3) containing a colorant which has a color tone correcting property, present on the other side of the transparent resin layer (1) opposite from the antireflection layer (2).

17 Claims, 1 Drawing Sheet

FOREIGN PATENT DOCUMENTS

Figure 1:
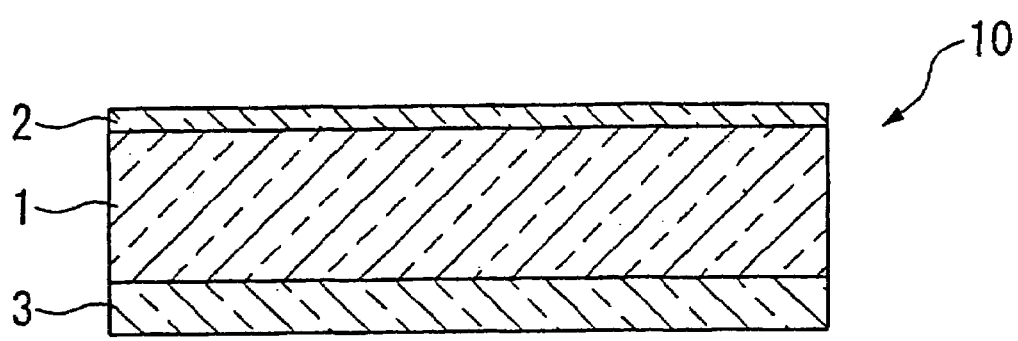

| | | |
|---|---|---|
| JP | 11167350 | 6/1999 |
| JP | 11223723 | 8/1999 |
| JP | 2000-249804 | 9/2000 |
| JP | 2000250420 | 9/2000 |

* cited by examiner

OPTICAL FILM

This application is a Divisional application of U.S. Ser. No. 10/176,683 filed Jun. 24, 2002, now allowed.

The present invention relates to an optical film having an antireflection property and having an optical correcting property such as a color tone correcting property or a near infrared ray absorption property, and a process for producing it.

For various displays such as a cathode-ray tube (CRT), a visual display terminal (VDT), a liquid crystal display (LCD), a plasma display (hereinafter referred to as PDP) and the like, an antireflection film has conventionally been provided on a display surface in order to improve the visibility. Further, not only for the displays, but also for various optical articles such as windows of architectural structures or vehicles, an antireflection film may be used in some cases.

Such an antireflection film is usually provided as an outermost layer of e.g. an optical article, and consequently tends to get external scratches. Optical properties of the film will change if the external scratches remain, and therefore it is important for the antireflection film to have good scratch resistance.

Further, especially for displays which are likely to emit electromagnetic waves from a display, such as PDP, it is requested to shield near infrared rays as heat radiation which are likely to generate a noise for an electronic equipment, on the viewer's side of the display, and for example, ① JP-A-10-219006 proposes an optical film comprising a polyurethane resin layer and a thin film layer having an antireflection property, and having an infrared ray absorption property imparted thereto. In ①, an infrared ray absorbent is contained either in a polyurethane resin layer or in another synthetic resin layer.

The polyurethane resin layer in ① is made of a thermoplastic polyurethane resin or a thermosetting polyurethane resin, which is transparent and has a self-healing property and scratch resistance, and by providing an antireflection thin layer thereon, an antireflection film excellent in scratch resistance can be obtained.

However, there has been a problem such that it takes relatively long time to form a layer made of thermoplastic or thermosetting polyurethane resin, whereby the productivity tends to be poor.

Further, ② JP-A-2000-249804 discloses an antireflection substrate comprising a transparent cured layer of a photo-curable resin and a low refractive index layer to impart an antireflection property laminated on the transparent layer.

In ②, the transparent cured layer made of a photo-curable resin can be formed by a simple and highly productive method, and an antireflection substrate excellent in scratch resistance can be obtained with high productivity.

By the way, for optical articles performing a color display such as color PDP, in order to improve the image quality, a color tone correction of a visible light emitted from a screen is requested in some cases. The color tone correction of a visible light can be carried out, for example, by letting a light be transmitted through a colored transparent layer having a property of selectively absorbing a light in a specific wavelength region. Further, as mentioned above, it is requested to shield near infrared rays on the viewer's side of a display in some cases depending on the property of the display.

The above ② discloses that e.g. a near infrared ray absorbent or a colorant may be mixed in the photo-curable resin.

However, it was found that even by incorporating a near infrared ray absorbent or a colorant such as a coloring agent into the transparent cured layer of the photo-curable resin to impart a near infrared ray absorption property or a color tone correcting property as disclosed in ②, the colorant may be deteriorated by irradiation with ultraviolet rays for curing the photo-curable resin, therefore no desired optical correcting property can appropriately be obtained.

Further, it was also found that a shield of ultraviolet ray shielding by the colorant in the photo-curable resin occurs, and consequently, the curing of the photo-curable resin by irradiation with ultraviolet rays is less likely to proceed, and it becomes necessary to increase the dose of the irradiation with ultraviolet rays, which decreases the production efficiency.

Under these circumstances, the present invention has been made to overcome the above problems, and it is an object of the present invention to provide an optical film having an antireflection property and having an optical correcting property such as a color tone correcting property or a near infrared ray absorption property, and being excellent in productivity, and a process for producing it.

The present inventors have conducted extensive studies on the cause of the deterioration of the colorant by irradiation with ultraviolet rays, and as a result, found that a radical generated in the photo-curable resin at the time of the irradiation with ultraviolet rays is a major factor of the deterioration of the colorant. They have further found that if the colorant exists without being in contact with the photo-curable resin, the deterioration of the colorant at the time of the irradiation with ultraviolet rays can be prevented and the curing of the photo-curable resin is not inhibited. The present invention has been accomplished on the basis of these discoveries.

Namely, the optical film of the present invention comprises a transparent resin layer (1) made of a photo-curable resin having a self-healing property, an antireflection layer (2) present on one side of the transparent resin layer (1), and a color tone correcting layer (3) containing a colorant which has a color tone correcting property, present on the other side of the transparent resin layer (1) opposite from the antireflection layer (2).

With respect to the optical film of the present invention, the transparent resin layer (1) made of a photo-curable resin can be cured rapidly by irradiation with ultraviolet rays, and accordingly production of the transparent resin layer (1) can be performed simply with good productivity.

Further, no colorant for color tone correction is contained in the transparent resin layer (1) made of a photo-curable resin, and the color tone correcting layer (3) is provided separately from the transparent resin layer (1), whereby the deterioration of the colorant by a radical generated in the transparent resin layer (1) at the time of the irradiation with ultraviolet rays, can be prevented, and the inhibition of curing of the photo-curable resin by the colorant is also prevented.

Further, since the transparent resin layer (1) as an underlayer of the antireflection layer (2), is made of a photo-curable resin having a self-healing property, the surface of the antireflection layer (2) is less likely to be scratched, and an excellent scratch resistance can be obtained.

Further, since the antireflection layer (2) and the color tone correcting layer (3) are united with the transparent resin layer (1) sandwiched therebetween, both of an antireflection property and an optical correcting property can be obtained, good handling efficiency can be obtained and the mounting and processing can be performed easily.

In the present invention, in the color tone correcting layer (3), a colorant which has a near infrared ray absorption property may be contained in addition to the colorant which has a color tone correcting property. With such a construction, an optical film having both a property of correcting the color tone of visible light and a property of absorbing near infrared rays, can be obtained.

In the present invention, the antireflection layer (2) is preferably made of a non-crystalline fluoropolymer. The non-crystalline fluoropolymer has a low refractive index, a high transparency and an excellent antireflection property, and by providing a layer made of this material on the transparent resin layer (1) having a self-healing property, a good scratch resistance can also be obtained.

The non-crystalline fluoropolymer is preferably a polymer having a fluorine-containing alicyclic structure.

In the present invention, it is preferred to provide an interlayer having a refractive index higher than that of the transparent resin layer (1), between the transparent resin layer (1) and the antireflection layer (2), whereby the antireflection property may further be improved.

The interlayer is preferably one member selected from the group consisting of a layer made of a resin having a refractive index higher than the refractive index of the transparent resin layer, a layer made of a metal oxide having a refractive index higher than the refractive index of the transparent resin layer, and a layer containing a metal oxide having a refractive index higher than the refractive index of the transparent resin layer.

The process for producing the optical film of the present invention comprises laminating, on a transparent substrate, a color tone correcting layer (3) containing a colorant which has a color tone correcting property, a transparent resin layer (1) made of a photo-curable resin having a self-healing property, and an antireflection layer (2), in this order.

By laminating an interlayer and the antireflection layer (2) in this order on the transparent resin layer (1), an optical film having an interlayer can be produced.

Otherwise, the process for producing the optical film of the present invention comprises laminating on one side of a transparent substrate, a transparent resin layer (1) made of a photo-curable resin having a self-healing property, and an antireflection layer (2) in this order, and forming a color tone correcting layer (3) containing a colorant which has a color tone correcting property on the other side of the transparent substrate.

By laminating an interlayer and the antireflection layer (2) in this order on the transparent resin layer (1), an optical film having an interlayer can be produced.

In the accompanying drawing:

FIG. 1 is a schematic sectional view illustrating a substantial part of one embodiment of the optical film of the present invention.

The optical film 10 of the present embodiment comprises a transparent resin layer 1, an antireflection layer 2 provided on one side of the transparent resin layer 1, and a color tone correcting layer 3 provided on the other side of the transparent resin layer 1 opposite from the antireflection layer 2.

Now, the detail will be explained about each layer.

Transparent Resin Layer

In the present invention, the transparent resin layer 1 is made of a photo-curable resin having a self-healing property.

In the present invention, having a self-healing property means that "a value of the maximum load measured by a HEIDON scratch tester, with which scratches formed by using as a scratcher a diamond chip having a tip diameter of 15 μm at 23° C. in a relative humidity of 50%, can disappear" (hereinafter referred to as a self-healing degree) is at least 10 g. The self-healing degree of the transparent resin layer 1 in the present invention is preferably at least 30 g.

Further, the transparent resin layer 1 of the present invention has a tensile stress at an elongation of 10%, measured in accordance with a tensile test method based on JIS K7127 at 23° C. in a relative humidity of 50%, of preferably at least 2 MPa from the viewpoint of having a sufficient strength for practical use, preferably not exceeding 30 MPa from the viewpoint of having a sufficient self-healing property. The tensile stress is particularly preferably from 2 to 20 MPa.

In order to exhibit sufficient self-healing property of the transparent resin layer 1, the thickness of the transparent resin layer 1 is preferably at least 10 μm, and in order to conduct photo-curing efficiently, it is preferably at most 1,000 μm. It is particularly preferably from 20 to 500 μm.

The photo-curable resin constituting the transparent resin layer 1 of the present invention, is a composition containing a photopolymerizable monomer and a photoinitiator as essential components, and undergoes curing by irradiation with electromagnetic waves such as ultraviolet rays to form a cured product having a self-healing property.

The photoinitiator is a material which gets excited by absorbing a light energy, and generates a radical to initiate the polymerization reaction of the photopolymerizable monomer.

As a polymerization reaction site of the photopolymerizable monomer, e.g. an acryloyl group, a methacryloyl group, a vinyl group, an allyl group, a mercapto group or an amino group may be mentioned. Particularly, an acryloyl group and a methacryloyl group have high reactivity and are preferred.

Specific examples of the photopolymerizable monomer include unsaturated polyester, epoxy acrylate, urethane acrylate, polyester acrylate, alkyd acrylate, silicone acrylate, polyene/polythiol type spiran, amino alkyd, hydroxyethyl acrylate and vinyl ether. Among them, particularly one having a low shrinkage ratio at the time of the curing is preferred, specifically, urethane acrylate is preferred. These monomers may be used as a mixture of two or more of them.

As the urethane acrylate, one made from a non-yellowing polyisocyanate compound is preferred. As the non-yellowing polyisocyanate, 4,4'-methylenebis(cyclohexyl isocyanate), isophorone diisocyanate, cyclohexane diisocyanate, tetramethylene diisocyanate, hexamethylene diisocyanate, for example, may be mentioned.

In the present invention, the curing shrinkage ratio of the transparent resin layer 1 is preferably less than 10%, and more preferably at most 8%. If the cure shrinkage ratio is less than 10%, no warpage tends to be formed on the optical film 10, and particularly when the optical film is used as stuck to a display surface of various displays or other parts, the handling for sticking become efficient.

Here, the cure shrinkage ratio is a value expressed by {((density after curing)−(density before curing))/(density before curing)}×100 (%).

As the photoinitiator, a cleavage type photoinitiator such as benzoin ether, 1-hydroxycyclohexyl phenyl ketone, 2-methyl-1-(4-(methylthio)phenyl)-2-morpholinopropane-1-one or 2,2-dimethoxy-1,2-diphenylethane-1-one, a hydrogen plucking type photoinitiator such as benzophenone, thioxanthone, xanthone, 2-chlorothioxanthone, Michler's ketone, 2-isopropylthioxanthone, benzyl, 9,10-phenanthrenequinone or 9,10-anthraquionone may, for example, be mentioned. These photoinitiators may be used as a mixture of two or more of them as the case requires.

The amount of the photoinitiator to be incorporated is determined by the type of the photopolymerizable monomer and the thickness of the transparent resin layer 1, and is preferably from 0.1 to 10 parts by weight per 100 parts by weight of the total amount of the photopolymerizable monomer. Further, in order to impart additional properties to the photo-curable resin, a light stabilizer, an antioxidant, an ultraviolet ray absorbent, an antistatic agent or the like may be mixed in the photo-curable resin to the extent of not preventing the curing and not deteriorating the elasticity.

The method for preparing the photo-curable resin is preferably such that a photopolymerizable monomer and a photoinitiator are mixed and stirred at a temperature at which no gelation takes place, until a uniform solution is formed.

A light source to cure the photo-curable resin may be any device capable of generating a wavelength contributing to the curing reaction efficiently, such as a low pressure mercury lamp, a high pressure mercury lamp, a super high pressure mercury lamp, a metal halide lamp, an ultraviolet laser, an electrodeless discharge lamp or an electron beam.

The method to form the transparent resin layer 1 may, for example, be a method of coating a support by means of a coating method such as dip coating, roll coating, spray coating, gravure coating, comma coating or die coating, followed by curing by irradiation with ultraviolet rays. Further, a method of covering the coated surface coated by any of the above methods, with a covering material having a smooth releasing surface and having a good transparency to the light for irradiation such as ultraviolet rays, so that the smooth releasing surface of the covering material contacts with the coated surface, followed by irradiation with a light such as ultraviolet rays for curing, may also be used. The latter method is a preferred method, since an unfavorable effect on the curing due to oxygen or water in the air can be inhibited at the time of the photo-curing, and a transparent resin layer 1 having a smooth surface can be obtained as well. The light such as ultraviolet rays may be irradiated through the covering material or from the other side of the covering material. The covering material may be any material so long as it has good transparency to the light for irradiation, and having a smooth releasing surface, and is preferably a film made of a transparent polymer material, at least one side of which not subjected to an adhesion facilitating treatment, or at least one side of which subjected to a release treatment. For example, a polyester type film, a polyacryl type film, a cellulose type film, a polyether sulfone film or a polycarbonate film may, for example, be mentioned, but the film is not limited thereto. Particularly, a polyester type film, one side of which not subjected to adhesion facilitating treatment, is preferred. As a polyester type film, a polyethylene terephthalate film is particularly preferred. By the above-mentioned coating methods, continuous processing is possible, whereby the productivity is excellent as compared with e.g. a batch type vapor deposition method. Particularly, die coating is preferred since it is excellent in continuous productivity and capable of forming a large size film, the film thickness deviation is small, and it can easily be applied to from small scale to large scale.

Further, an antiglare layer may be formed on the surface of the transparent resin layer 1 by a method of incorporating particles of e.g. a silica sol into the photo-curable resin constituting the transparent resin layer 1, or a method of subjecting the surface of the transparent resin layer 1 to embossing. An antiglare layer may be formed also by laminating on the transparent resin layer, another transparent layer containing particles of e.g. a silica sol.

Antireflection Layer

As a material for forming the antireflection layer 2, a transparent material having a refractive index lower than that of the transparent resin layer 1, is preferably used. In the present invention, the refractive index of the transparent resin layer 1 is preferably from 1.45 to 1.55, and the refractive index of the antireflection layer 2 is preferably at most 1.36. The difference in the refractive index between the transparent resin layer 1 and the antireflection layer 2 is preferably from 0.09 to 0.19.

The thickness of the antireflection layer 2 is, in order to obtain a sufficient antireflection effect, from 10 to 500 nm, preferably from 30 to 300 nm, more preferably from 50 to 200 nm.

In the present invention, as a material for the antireflection layer 2, a non-crystalline fluoropolymer is preferably used. The non-crystalline fluoropolymer is free from light scattering by crystals and is excellent in transparency.

As the non-crystalline fluoropolymer, ① a polymer having a fluorine-containing alicyclic structure on its main chain, obtained by polymerizing a fluorine-containing monomer having an alicyclic structure, or ② a polymer having a fluorine-containing alicyclic structure on its main chain, obtained by cyclic polymerization of a fluorine-containing monomer having at least two polymerizable double bonds, are preferred.

Having a fluorine-containing alicyclic structure on its main chain means having a structure wherein at least one carbon atom constituting the aliphatic ring is a carbon atom in the carbon chain constituting the main chain, and a fluorine atom or a fluorine-containing group is connected to at least a part of carbon atoms constituting the aliphatic ring.

The polymer ① having a fluorine-containing alicyclic structure on its main chain, which is obtained by polymerizing a monomer having a fluorine-containing ring structure, is known from e.g. JP-B-63-18964. Namely, it may, for example, be a homopolymer of a monomer having a fluorine-containing alicyclic structure such as perfluoro(2,2-dimethyl-1,3-dioxol), or a copolymer of said monomer with a radical polymerizable monomer such as tetrafluoroethylene.

The polymer ② having a fluorine-containing alicyclic structure on its main chain, which is obtained by cyclic polymerization of a fluorine-containing monomer having at least two polymerizable double bonds, is known from e.g. JP-A-63-238111 and JP-A-63-238115. Namely, it may, for example, be a polymer obtained by cyclic polymerization of a fluorine-containing monomer having at least two polymerizable double bonds such as perfluoro(allyl vinyl ether) or perfluoro(butenyl vinyl ether), or a copolymer of a fluorine-containing monomer having at least two polymerizable double bonds with a radical polymerizable monomer such as tetrafluoroethylene.

Or, it may be a polymer obtained by copolymerizing a monomer having a fluorine-containing alicyclic structure such as perfluoro(2,2-dimethyl-1,3-dioxol) with a fluorine-containing monomer having at least two polymerizable double bonds such as perfluoro(allyl vinyl ether) or perfluoro(butenyl vinyl ether).

As the polymer having a fluorine-containing alicyclic structure, a polymer having a fluorine-containing alicyclic structure on its main chain is suitable, and preferred is one containing at least 20 mol % of monomer units having a fluorine-containing alicyclic structure in the monomer units constituting the polymer, from the viewpoint of transparency and mechanical properties.

The polymer having a fluorine-containing alicyclic structure is preferably one having on its terminal a reactive group which may undergo chemical bonding or anchor bonding with a material for a layer under the antireflection layer. Such a reactive group may, for example, be a hydroxyl group, a carboxyl acid group, an amino group, an epoxy group, an acryloyl group, a methacryloyl group, an isocyanate group, a cyano group, a carbamoyl group, a mercapto group or a vinyl group.

The polymer having a fluorine-containing alicyclic structure on its main chain may be commercially available as "CYTOP" (tradename) manufactured by Asahi Glass Company, Limited, and any known fluoropolymer may be used in the present invention.

Here, in the present invention, in order to increase the adhesion between the transparent resin layer 1 and the antireflection layer 2, 1) an adhesive layer may be provided between the above layers, or 2) an additive for strengthening adhesion may be added to the antireflection layer 2. With respect to the above item 1), the thickness of the adhesive layer is preferably from 1 to 50 nm so as not to deteriate the optical properties of the optical film 10 of the present invention, and with respect to the above item 2), the amount of the additive is preferably at most 50 parts by mass per 100 parts by mass of the non-crystalline fluoropolymer which forms the antireflection layer 2, from the same reason as mentioned above. As a material constituting the adhesive layer or additive, the following alkoxysilanes may be mentioned, and they may be used alone or in combination as a mixture of two or more of them:

Monoalkoxysilanes such as vinyltriethoxysilane, trimethylmethoxysilane, trimethylethoxysilane, dimethylvinylmethoxysilane and dimethylvinylethoxysilane; dialkoxysilanes such as γ-chloropropylmethyldimethoxysilane, γ-chloropropylmethyldiethoxysilane, γ-aminopropylmethyldiethoxysilane, γ-aminopropylmethyldimethoxysilane, N-β-(aminoethyl)-γ-aminopropylmethyldimethoxysilane, N-β-(aminoethyl)-γ-aminopropylmethyldiethoxysilane, γ-glycidyloxypropylmethyldimethoxysilane, γ-glycidyloxypropylmethyldiethoxysilane, γ-methacryloxypropylmethyldimethoxysilane, methyldimethoxysilane, methyldiethoxysilane, dimethyldimethoxysilane, dimethyldiethoxysilane, methylvinyldimethoxysilane, methylvinyldiethoxysilane, diphenyldimethoxysilane, diphenyldiethoxysilane, 3,3,3-trifluoropropylmethyldimethoxysilane, 3,3,4,4,5,5,6,6,7,7,8,8,8-tridecafluorooctylmethyldimethoxysilane and 3,3,4,4,5,5,6,6,7,7,8,8,9,9,10,10,10-heptadecafluorodecylmethyldimethoxysilane; and tri- or tetra-alkoxysilanes such as γ-aminopropyltrimethoxysilane, γ-aminopropyltriethoxysilane, N-β-(aminoethyl)-γ-aminopropyltrimethoxysilane, N-β-(aminoethyl)-γ-aminopropyltriethoxysilane, γ-mercaptopropyltrimethoxysilane, γ-glycidyloxypropyltrimethoxysilane, γ-glycidyloxypropyltriethoxysilane, γ-methacryloxypropyltrimethoxysilane, γ-chloropropyltrimethoxysilane, methyltriethoxysilane, phenyltrimethoxysilane, phenyltriethoxysilane, 3,3,3-trifluoropropyltrimethoxysilane, 3,3,4,4,5,5,6,6,7,7,8,8,8-tridecafluorooctyltrimethoxysilane, 3,3,4,4,5,5,6,6,7,7,8,8,9,9,10,10,10-heptadecafluorodecyltrimethoxysilane, tetramethoxysilane and tetraethoxysilane.

As particularly preferred ones which improve the adhesiveness to the transparent resin layer 1 without impairing the transparency of the antireflection layer 2, the following may be mentioned:

γ-aminopropyltriethoxysilane, γ-aminopropylmethyldiethoxysilane, γ-aminopropyltrimethoxysilane, γ-aminopropylmethyldimethoxysilane, N-β-(aminoethyl)-γ-aminopropyltrimethoxysilane, N-β-(aminoethyl)-γ-aminopropylmethyldimethoxysilane, N-β-(aminoethyl)-γ-aminopropyltriethoxysilane and N-β-(aminoethyl)-γ-aminopropylmethyldiethoxysilane; γ-glycidyloxypropyltrimethoxysilane, γ-glycidyloxypropylmethyldimethoxysilane, γ-glycidyloxypropyltriethoxysilane and γ-glycidyloxypropylmethyldiethoxysilane, having an epoxy group.

Further, the surface of the antireflection layer 2 as an outermost layer may be coated with a lubricant to impart abrasion resistance within a range of not impairing the antireflection property, or a lubricant may be incorporated into the antireflection layer 2. Such a lubricant may, for example, be a perfluoropolyether such as Krytox, tradename, manufactured by DuPont Inc., DEMNUM, tradename, manufactured by Daikin Industries, Ltd., DAIFLOIL, tradename, manufactured by Daikin Industries, Ltd., Fomblin, tradename, manufactured by Ausimont Inc., FLONLUBE, tradename, manufactured by Asahi Glass Company, Limited.

The method for forming the antireflection layer 2 is not particularly limited, and any optional forming method may be selected. For example, a polymer having a fluorine-containing alicyclic structure is soluble in a fluorine type solvent such as perfluorooctane, $CF_3(CF_2)_nCH=CH_2$ (wherein n is an integer of from 5 to 11), $CF_3(CF_2)_mCH_2CH_3$ (wherein m is an integer of from 5 to 11) or a fluorine-containing ether, and by coating with a solution of this polymer by an appropriate coating method, a desired thickness can easily be obtained.

Color Tone Correcting Layer

In the present invention, the color tone correcting layer 3 contains at least a colorant which has a color tone correcting property, and may further contain a colorant which has a near infrared ray absorption property. The colorant may be either a dye or a pigment.

The thickness of the color tone correcting layer 3 is, in order to obtain an adequate optical correcting property, preferably from 0.1 to 50 μm, and more preferably from 0.1 to 20 μm.

The color tone correcting layer 3 is preferably made of a material comprising a thermoplastic resin which is soluble in a solvent as the main component and having a colorant which has a color tone correcting property incorporated into the main component, or having a colorant which has a near infrared ray absorption property and a colorant which has a color tone correcting property incorporated into the main component.

As the thermoplastic resin as the main component of the color tone correcting layer 3, for example, a polyester type resin, an olefin type resin, a polyurethane type resin or the like may be used.

The colorant which has a color tone correcting property is used to selectively absorb part of a visible light in a specific wavelength region depending upon the purpose of use of the optical film 10, to improve the color tone of the transmitted visible light. Such a colorant having a color tone correcting property is preferably one having a narrow absorption band in the visible light region and a high transmittance in the other wavelength regions. Specifically, a known organic pigment, organic dye or inorganic pigment of azo type, condensed azo type, diimmonium type, phthalocyanine type, anthraquinone type, indigo type, perinone type, perylene type, dioxazine type, quinacridon type, methine type, isoindolinone type, quinophthalone type, pyrrole type, thioindigo type or metal complex type, may, for example, be mentioned. Preferred is a colorant having favorable weather resistance and having favorable compatibility or dispersibility with the main component in the color tone correcting layer 3, such as a diimmonium type, phthalocyanine type or anthraquinone type colorant, and they may be used alone or in combination as a mixture of at least two.

The colorant which has a near infrared ray absorption property may, for example, be a polymethine type, phthalocyanine type, metal complex type, aminium type, imonium type, diimonium type, anthraquinone type, dithiol metal complex type, naphthoquinone type, indolephenol type, azo type or triallylmethane type compound, but is not limited thereto. For the purpose of absorbing heat radiation and preventing noises of an electronic equipment, preferred is a near infrared ray absorbent having a maximum absorption wavelength of from 750 to 1,100 nm, and particularly preferred is a metal complex type, aminium type or diimonium type compound. The near infrared ray absorbent may be used alone or in combination as a mixture of at least two.

When the optical film 10 is used as a film for antireflection and optical correction for image display devices particularly for PDPs, into the color tone correcting layer 3, one type or plural types of colorants are preferably incorporated so as to selectively absorb and decay extra luminescent color (mainly in a wavelength region of from 560 to 610 nm) from a discharge gas sealed in the main body of PDP, such as a two component gas comprising neon and xenon. By such a colorant construction, of the visible light emitted from the PDP, extra light resulting from light emission of a discharge gas is absorbed in and decayed by the color tone correcting layer 3, and as a result, a display color of visible light emitted from the PDP can be made close to the aimed display color, whereby a PDP device capable of displaying natural color tones can be provided. Further, when a colorant which has a near infrared ray absorption property is contained in the color tone correcting layer 3, near infrared rays emitted from the PDP are absorbed in the color tone correcting layer 3, whereby the noise against an electric equipment can be prevented.

The amount of the colorant incorporated in the color tone correcting layer 3 is, from the viewpoint of providing a sufficient optical correcting property, preferably at least 0.1 mass % in total based on the thermoplastic resin as the main component of the color tone correcting layer 3, and from the viewpoint of ensuring the durability and weather resistance of the colorant, preferably at most 20 mass % in total based on the thermoplastic resin as the main component of the color tone correcting layer 3. It is more preferably from 0.1 to 10 mass %.

The solvent in which the resin as the main component is dissolved may, for example, be a ketone type solvent such as cyclopentanone or cyclohexanone, an ether type solvent, an ester type solvent such as butyl acetate, an ether alcohol type solvent such as ethyl cellosolve, a ketone alcohol type solvent such as diacetone alcohol or an aromatic solvent such as toluene. They may be used alone or as a mixed solvent system comprising at least two types mixed.

The method of forming the color tone correcting layer 3 is not particularly limited. For example, a substrate is coated with a coating liquid obtained by dissolving the main component and the colorant in a solvent, followed by drying, whereby a color tone correcting layer 3 in a desired thickness can be formed. As the coating method, dip coating, roll coating, spray coating, gravure coating, comma coating or die coating may, for example, be selected. By these coating methods, continuous processing is possible, whereby the productivity is excellent as compared with e.g. a vapor deposition method of batch type. Spin coating by which a thin uniform coating film can be formed can also be employed.

Production Process of Optical Film

The optical film 10 according to the present embodiment may be formed in such a manner that on a transparent substrate (not shown), the color tone correcting layer 3, the transparent resin layer 1 and the antireflection layer 2 are laminated in this order to form the optical film 10 integrated with the transparent substrate. Or, it may be formed in such a manner that on one side of the transparent substrate, the transparent resin layer 1 and the antireflection layer 2 are laminated in this order and the color tone correcting layer 3 is formed on the other side of the transparent substrate to form the optical film 10 integrated with the transparent substrate. In this case, it is also possible to form the color tone correcting layer 3 first and then to laminate the transparent resin layer 1 and the antireflection layer 2 in this order on the other side of the transparent substrate. The transparent substrate is preferably a film or a sheet which is transparent and which does not deteriorate the optical property. The transparent substrate may, for example, be a polyethylene terephthalate film, a polycarbonate film, a polymethylmethacrylate film, triacetylcellulose film or a glass sheet.

Otherwise, the optical film may also be formed in such a manner that on an appropriate substrate, preferably on a substrate with a releasing surface, the color tone correcting layer 3, the transparent resin layer 1 and the antireflection layer 2 are laminated in this order, then the optical film 10 comprising those three layers is separated from the substrate.

In order to strengthen the adhesion between the transparent resin layer 1 and the antireflection layer 2, prior to the formation of the antireflection layer 2, it is effective to apply an active energy ray treatment such as a corona discharge treatment or an ultraviolet ray treatment, or a treatment with a primer, to the surface of the transparent resin layer 1.

Use of Optical Film

The optical film 10 can be used as a film-like optical article as it is, or used as a component of an image display device as stuck to a display surface. It may also be used as a component of a touch panel for an image display device, as stuck to a display surface. Further, the optical film 10 can constitute an optical filter for an image display device, as it is or as laminated with another transparent substrate. The image display device may, for example, be PDP, a cathode ray tube (CRT), a visual display terminal (VDT), a liquid crystal display (LCD), a light emission display (LED), an electrochromic display (ECD), an electroluminescence panel or a projection display.

It may be used as stuck to another film-like optical article, or may be used as stuck to a window material. Said another film-like optical article may, for example, be a polarizing film, a light diffusion film, a phase difference film, a Fresnel lens film, a prism lens film or a lenticular film. The window material may, for example, be one for architectural structures or one for vehicles.

The method to stick the optical film 10 to such an optical article is not particularly limited, and a method such as adhesion bonding, sticking or heat such as gluing, adhesion, heat sealing may be selected. A tackifying layer may preliminarily be prepared on the color tone correcting layer 3 of the optical film 10 or, if the transparent substrate (not shown) is integrated with the color tone correcting layer 3, on the transparent substrate.

By applying the optical film 10 to an optical filter for an image display device, such effects that the reflection of outside light on the display surface is prevented by the antireflection layer 2, the brightness is improved, and the contrast is improved, can be obtained. Further, by the color tone correcting layer 3, it is possible to shield near infrared rays emitted from the display, or to improve the image quality by conducting color tone correction of visible light. Further, the optical film 10 contributes to improvement of the strength of the display surface and prevention of the scattering. Particularly, the optical film 10 has a high accuracy of optical correction since the deterioration of the colorant is suppressed during the production process, and has also an advantage in cost because it has a good productivity.

By applying the optical film 10 to a touch panel for an image display device, an antireflection property, a color tone changing property for visible light, a near infrared ray absorption property, a protection effect of the display surface and the like can be obtained, and besides, since particularly the transparent resin layer 1 has a self-healing property and has relatively high flexibility and elasticity, a touch panel using this will be one providing good feeling at the time of inputting with a finger or with a pen.

By applying the optical film 10 to various window materials for e.g. architectural structures or vehicles, it is possible to impart an antireflection property, a color tone changing property for visible light, a near infrared ray absorption property and the like to the window materials.

Other Preferred Embodiment

By providing an interlayer (not shown) having a refractive index higher than that of the transparent resin layer 1 between the transparent resin layer 1 and the antireflection layer 2, more excellent antireflection effect can be obtained.

The refractive index of the interlayer is preferably from 1.55 to 1.65. The difference in the refractive index between the interlayer and the antireflection layer 2 is preferably from 0.19 to 0.29. Further, the difference in the refractive index between the interlayer and the transparent resin layer 1 is preferably from 0.01 to 0.2, more preferably from 0.01 to 0.1.

The thickness of the interlayer is, in order to obtain a sufficient effect to improve the antireflection property by providing the interlayer, preferably at least 50 nm, and in order to obtain a sufficient effect to improve the scratch resistance of the antireflection layer 2 by providing the transparent resin layer 1 having a self-healing property underneath the antireflection layer 2, preferably at most 500 nm. It is particularly preferably at most 300 nm.

The interlayer is preferably a layer made of a resin having a refractive index higher than the refractive index of the transparent resin layer, a layer made of a metal oxide having a refractive index higher than the refractive index of the transparent resin layer, or a layer containing a metal oxide having a refractive index higher than the refractive index of the transparent resin layer.

The resin having a high refractive index is preferably a polymer having an aromatic ring on its main chain or side chains, such as polystyrene, poly(2-chlorostyrene), poly(2,6-dichlorostyrene), poly(2-bromostyrene), poly(2,6-dibromostyrene), polycarbonate, aromatic polyester, polysulfone, polyethersulfone, polyarylsulfone, poly(pentabromophenylmethacrylate), a phenoxy resin or its brominated product, or an epoxy resin or its brominated product, or a polymer containing e.g. a bromine or sulfur element. Further, it is possible to increase the adhesive property to the transparent resin layer 1 or to the antireflection layer 2, by modifying the terminal of such a resin with a reactive functional group. Among the above resins, e.g. a phenoxy resin and an epoxy resin have active functional groups at the terminals without modification, and they are preferred from the viewpoint of the adhesive property.

As the metal oxide, particularly by using a metal oxide having conductivity, the interlayer becomes one having conductivity, whereby an antistatic property can be imparted to the optical film 10. In a case where the antistatic property is required, the metal oxide preferably has a resistivity of from $1 \times 10^{-7}$ to $1 \times 10^3$ Ω·m.

The metal oxide may, for example, be $Sb_2O_5$, $SnO_2$, $In_2O_3$, $TiO_2$, $RuO_2$, $Yb_2O_3$, $Ag_2O$, $CuO$, or $FeO$, and, $Sb_2O_5$, $SnO_2$ and $In_2O_3$ having good transparency and film forming property are particularly preferred. Further, a layer made of a metal oxide and an oxide of an alloy of a metal such as Sb or Al, is also preferred, which further increases conductivity.

It is also possible to incorporate the above-described resin having a high refractive index or the above-described resin for the transparent substrate into a layer made of a metal oxide in order to improve the film forming property, or to incorporate a compound having a functional group which effectively functions for a chemical bonding such as an epoxy group, an amino group or a hydroxyl group into the layer in order to impart adhesion.

As a method of forming the interlayer, it is preferred to coat the transparent resin layer 1 with an organic solvent solution of a resin having a refractive index higher than the refractive index of the transparent resin layer 1 in the same method as the coating in production of the transparent resin layer 1, whereby the film formation cost is low, the coating property is excellent, and the layer can be produced stably.

Further, in order to strengthen the adhesion between the transparent resin layer 1 and the interlayer, it is effective to preliminarily apply an active energy ray treatment such as a corona discharge treatment or an ultraviolet ray treatment, or a treatment with a primer, to the surface of the transparent resin layer 1.

Now, the present invention will be described in further detail with reference to Examples. However, it should be understood that the present invention is by no means restricted to such specific Examples.

EXAMPLE 1

(a) Formation of Color Tone Correcting Layer

A colorant liquid A as a material for a color tone correcting layer was prepared as follows. Namely, a polyester resin for optical use (O-PET, tradename, manufactured by Kanebo Ltd.) as the main component, was dissolved in cyclopentanone so that the resin concentration would be 10% to obtain a main component solution of a color tone correcting layer.

To 100 g of this main component solution, 0.063 g of a red dye (Waxline Red MP-FW, tradename, manufactured by Avecia Ltd.) and 0.0729 g of a blue dye (Waxline Blue AP-FW, tradename, manufactured by Avecia Ltd.) were added, followed by stirring until those dyes were completely dissolved to obtain a colorant liquid A.

A transparent substrate made of a polyethylene terephthalate film having a thickness of 100 μm was coated with the colorant liquid A by a bar coater so that the thickness of the dried coating film would be 2 μm, and made to pass through an oven having its temperature adjusted to 120° C. for 2 minutes so that the solvent was distilled off to form a color tone correcting layer.

(b) Formation of Transparent Resin Layer

A resin liquid B as a material for a transparent resin layer was prepared as follows. Namely, 70 parts by mass of a non-yellowing type urethane acrylate (UF-8001, tradename, manufactured by Kyoeisha Chemical Co., Ltd.), 30 parts by mass of tripropylene glycol diacrylate (ARONIX M220, tradename, manufactured by Toagosei Co, Ltd.) and 3 parts by mass of benzophenone were mixed to obtain a uniform resin liquid B.

The color tone correcting layer formed in the above-mentioned Step (a) was coated with the resin liquid B by a bar coater, followed by irradiation with ultraviolet rays with a dose of 600 mj/cm$^2$ by a high pressure mercury lamp (120 mW/cm$^2$, the distance from the light source to the irradiated plane: 150 mm, line speed: 2.5 m/min) to form a transparent resin layer having a thickness of 0.2 mm without a tuck.

(c) Formation of Interlayer and Antireflection Layer

A corona discharge treatment was applied to the surface layer of the transparent resin layer formed in the above-mentioned Step (b), and the surface layer was spin-coated with a solution having a brominated phenoxy resin (Phenotohto YPB-43C, tradename, manufactured by Tohto Kasei Co., Ltd., molecular weight: 60,000, refractive index: 1.63) diluted to 2% with cyclohexane (coating condition: 500 rpm×10 sec and 3,000 rpm×20 sec) to form an interlayer (refractive index: 1.60, film thickness: about 100 nm).

Then, the interlayer was spin-coated with a solution having a solution of a non-crystalline fluoropolymer (CTL-805A, tradename, manufactured by Asahi Glass Company, Limited) diluted to 2% with a solvent (CT-SOLV180, tradename, manufactured by Asahi Glass Company, Limited) (coating condition: 500 rpm×10 sec and 3,000 rpm×20 sec), followed by heating at 140° C. for 10 minutes so that the solvent was distilled off to form an antireflection layer having a thickness of about 100 nm, to obtain an optical film.

EXAMPLE 2

An optical film was produced in the same manner as in Example 1 except that a different photo-curable resin to form a transparent resin layer was used.

First, a color tone correcting layer was formed in the same manner as in Step (a) of Example 1.

Then, in order to form a transparent resin layer, 50 parts by mass of a non-yellowing type urethane acrylate (UF-503LN, tradename, manufactured by Kyoeisha Chemical Co., Ltd.), 50 parts by mass of tripropylene glycol diacrylate (ARONIX M220, tradename, manufactured by Toagosei Co, Ltd.) and 3 parts by mass of benzophenone were mixed to obtain a uniform resin liquid C.

The color tone correcting layer formed as mentioned above was coated with the resin liquid C by a bar coater, and irradiated with ultraviolet rays under the same condition as in Step (b) of Example 1 to form a transparent resin layer having a thickness of 0.2 mm without a tuck.

An antireflection layer was formed on the transparent resin layer in the same manner as in Step (c) of Example 1 to obtain an optical film.

EXAMPLE 3

An optical film was produced in the same manner as in Example 1 except that a photo-curable resin to form a transparent resin layer, having a different cure shrinkage ratio, was used.

First, a color tone correcting layer was formed in the same manner as in Step (a) of Example 1.

Then, in order to form a transparent resin layer, 80 parts by mass of $CH_2$=$CHOCH_2CH(OH)CH_2O(CH_2)_6OCH_2CH(OH)CH_2OCH$=$CH_2$ (KAYARAD R-167, tradename, manufactured by Nippon Kayaku Co., Ltd.), 20 parts by mass of $CH_2$=$CHCO(OE)_nO\Phi CH_2\Phi O(EO)_mCOCH$=$CH_2$, wherein E is a 1,2-ethylene group, $\Phi$ is a 1,4-phenylene group, n+m=4 (KAYARAD R-712, tradename, manufactured by Nippon Kayaku Co., Ltd.) and 3 parts by mass of benzophenone were mixed to obtain a uniform resin liquid D.

The color tone correcting layer formed as mentioned above was coated with the resin liquid D by a bar coater, and irradiated with ultraviolet rays under the same condition as in Step (b) of Example 1, to form a transparent resin layer having a thickness of 0.2 mm without a tuck.

An antireflection layer was formed on the transparent resin layer in the same manner as in Step (c) of Example 1 to obtain an optical film.

EXAMPLE 4

An optical film was produced in the same manner as in Example 1 except that the laminating order was changed.

First, a resin liquid B was obtained in the same manner as in Step (b) of Example 1. A transparent substrate made of a polyethylene terephthalate film having a thickness of 100 μm was coated with the resin liquid B by a bar coater, followed by irradiation with ultraviolet rays under the same condition as in Step (b) of Example 1 to form a transparent resin layer having a thickness of 0.2 mm without a tuck.

On this resin layer, an interlayer and an antireflection layer were formed in the same manner as in Step (c) of Example 1.

Then, in order to constitute a color tone correcting layer, a colored layer A were obtained in the same manner as in Step (a) of Example 1.

On the other side of the transparent substrate made of a polyethylene terephthalate film opposite from the side on which the transparent resin layer and the antireflection layer were formed, a color tone correcting layer was formed in the same manner as in Step (a) of Example 1 to obtain an optical film.

EXAMPLE 5

An optical film was produced in the same manner as in Example 1 except that the method of forming the transparent resin layer was changed.

First, a color tone correcting layer was formed in the same manner as in Step (a) of Example 1. The color tone correcting layer was coated with a resin liquid B prepared in the same condition as in Step (b) of Example 1 by a bar coater, and a covering material made of a polyethylene terephthalate film (thickness: 100 μm), one side of which not subjected to an adhesion facilitating treatment, different from the above-mentioned transparent substrate, was laminated thereon by using a laminator employing two rolls arranged to have a spacing of 400 μ, so that the surface of the covering material not subjected to an adhesion facilitating treatment was in contact with the surface coated with resin liquid B. Then, irradiation with ultraviolet rays with a dose of 700 mj/cm$^2$ was carried out by a high pressure mercury lamp (120 mW/cm$^2$, the distance from the light source to the irradiated plane: 150 mm, line speed: 2.0 m/min) through the covering material, then the covering material was separated. As a result, a transparent resin layer having a thickness of 0.2 mm, having no tuck and having high smoothness was formed on the color tone correcting layer.

Then, an antireflection layer was formed on the transparent resin layer in the same manner as in Step (a) of Example 1 to obtain an optical film.

EXAMPLE 6

An optical film was produced in the same manner as in Example 4 except that the method of forming the transparent resin layer was changed.

First, a resin liquid B was obtained in the same manner as in Step (b) of Example 1. A transparent substrate made of a polyethylene terephthalate film having a thickness of 100 μm was coated with the resin liquid B by a bar coater, and a covering material made of a polyethylene terephthalate film (thickness: 100 μm), one side of which not subjected to an adhesion facilitating treatment, different from the transparent substrate, was laminated thereon by using a laminator employing two rolls arranged to have a spacing of 400 μ, so that the surface not subjected to an adhesion facilitating treatment was in contact with the surface coated with the resin liquid B. Then, irradiation with ultraviolet rays with a dose of 700 mj/cm$^2$ was carried out by a high pressure mercury lamp (120 mW/cm$^2$, the distance from the light source to the irradiated plane: 150 mm, line speed: 2.0 m/min) through the covering material, then the covering material was separated. As a result, a transparent resin layer having a thickness of 0.2 mm, having no tuck and having high smoothness was formed on the transparent substrate.

Then, an interlayer and an antireflection layer were formed on the transparent resin layer in the same manner as in Step (c) of Example 1.

A color tone correcting layer was formed on the other side of the transparent substrate made of a polyethylene terephthalate film opposite from the side on which the transparent resin layer and the antireflection layer were formed, in the same manner as in Step (a) of Example 1, to obtain an optical film.

COMPARATIVE EXAMPLE 1

An optical film was produced in the same manner as in Example 1 except that no color tone correcting layer was formed, and a colorant was contained in a transparent resin layer made of a photo-curable resin having a self-healing property.

First, 70 parts by mass of a non-yellowing type urethane acrylate (UF-8001, tradename, manufactured by Kyoeisha Chemical Co., Ltd.) and 30 parts by mass of tripropylene glycol diacrylate (ARONIX M220, tradename, manufactured by Toagosei Co, Ltd.) were mixed to obtain a uniform resin liquid. To this resin liquid, 6 parts by mass of a red dye (RED MP-FW, tradename, manufactured by Avecia, Ltd.), 7 parts by mass of a blue dye (Blue AP-FW, tradename, manufactured by Avecia, Ltd.) and 3 parts by mass of benzophenone, per 100 parts by mass of the resin component were added and mixed to obtain a colored photo-curable resin liquid E.

A transparent substrate made of a polyethylene terephthalate film having a thickness of 100 μm was coated with the colored photo-curable resin liquid E by a bar coater, followed by irradiation with ultraviolet rays under the same condition as in Step (b) of Example 1, whereupon a tuck was formed on the colored transparent resin layer and the curing was not sufficient. Then, irradiation with ultraviolet rays with a dose of 600 mj/cm$^2$ was further carried out to form a colored transparent resin layer having a thickness of 0.2 mm without a tuck.

An antireflection layer was formed on the colored transparent resin layer in the same manner as in Step (c) of Example 1 to obtain an optical film.

COMPARATIVE EXAMPLE 2

An optical film was produced in the same manner as in Example 1 except that a thermosetting urethane resin having a self-healing property was used as a material for the transparent resin layer instead of the photo-curable resin having a self-healing property.

Namely, a color tone correcting layer was formed in the same manner as in Step (a) of Example 1, and a transparent resin layer made of a thermosetting polyurethane resin was formed by the following method. First, a blend composition as identified in Table 1 was heated at 80° C. for 3 hours for melting, and mixed by stirring to obtain a uniform liquid I. Separately, a blend composition as identified in Table 2 was heated at 80° C. for 3 hours for melting, and mixed by stirring to obtain a uniform liquid II. The liquid I and the liquid II were mixed with a mass ratio of 40:60. Then, the color tone correcting layer formed as mentioned above was coated with the mixture of the liquid I and the liquid II by a bar coater, and made to pass through an oven having its temperature adjusted to 120° C. for 10 minutes to complete a reaction of the liquid I with the liquid II. Then, curing was carried out in an oven having its temperature adjusted to 60° C. for 15 hours to form a transparent resin layer having a thickness of 0.2 mm.

An antireflection layer was formed on the transparent resin layer in the same manner as in Step (c) of Example 1 to form an optical film.

TABLE 1

| Liquid I | |
|---|---|
| Polycaprolactonetriol with a hydroxyl value of 196.4 | 78.2 parts by mass |
| Polycaprolactonetriol with a hydroxyl value of 540.3 | 19.6 parts by mass |
| Silicone type extender *1 | 0.5 part by mass |
| Antioxidant *2 | 0.5 part by mass |
| Ultraviolet ray absorbent *3 | 0.7 part by mass |
| Light stabilizer *4 | 0.5 part by mass |

*1 BYK-300, tradename, manufactured by Byk-Chemie Japan K.K.
*2 IRGANOX 1010, tradename, manufactured by Ciba-Geigy
*3 TINUVIN 328, tradename, manufactured by Ciba-Geigy
*4 MARK LA-77, tradename, manufactured by Asahi Denka Kogyo K.K.

TABLE 2

| Liquid II | |
|---|---|
| Isocyanurate-modified hexamethyleneisocyanate having an isocyanate group content of 21.4% | 100 parts by mass |
| Dibuthyltin dilaurate | 0.001 part by mass |

Evaluation of Optical Film

With respect to the optical film obtained in each of above-mentioned Examples, an increase of the haze value was measured in order to evaluate scratch resistance.

The increase of the haze value is used as an index of the scratch resistance and is "a value (%) expressed by {(a haze value after abrasion test)–(a haze value before abrasion test)} when a Taber abrasion test was carried out by employing CS-10F as truck wheels under a load of 500 g at 23° C. under a relative humidity of 50% for 100 cycles". With regard to an optical film, there is no problem if the haze value increase is at most 3%.

The measurement results of the haze value increase are shown in Table 3. The measurement of the haze value was carried out at four points on the abrasion cycle track, and the average value was calculated.

With respect to the optical film obtained in each of the above-mentioned Examples, deterioration of the colorant was evaluated by a method as follows. Immediately after the formation of the color tone correcting layer, and immediately after the formation of the transparent resin layer, a spectral transmittance was measured by a spectrophotometer to obtain the difference in the transmittance. As the deterioration of the colorant by ultraviolet ray irradiation develops, the difference in the transmittance increases. The results are shown in Table 3.

Further, in each of the above-mentioned Examples, the density of the transparent resin layer was measured before and after the curing of the transparent resin layer, and the cure shrinkage ratio was calculated. The results are shown in Table 3.

Further, a self-healing degree of the transparent resin layer was measured in each of the above-mentioned Examples. The results are shown in Table 3.

In Table 3, the transmittance of the optical film obtained in each of the above-mentioned Examples, and the dose of ultraviolet ray irradiation (UV irradiation dose) at the time of forming the transparent resin layer are also shown.

As described above, according to the present invention, an optical film having an antireflection property and having an optical correcting property such as near infrared ray absorption or color tone correction of visible light can be obtained with good productivity.

The entire disclosure of Japanese Patent Application No. 2001-191632 filed on Jun. 25, 2001 including specification, claims, drawing and summary are incorporated herein by reference in its entirety.

What is claimed is:

1. An optical film which comprises a transparent resin layer (1) made of a photocured photo-curable urethane resin having a self-healing property, an antireflection layer (2) present on one side of the transparent resin layer (1) and having a thickness of from 10 to 500 nm, and a color tone correcting layer (3) containing a colorant which has a color tone correcting property, present on the other side of the transparent resin layer (1) opposite from the antireflection layer (2).

2. The optical film according to claim 1, wherein the antireflection layer (2) is made of a non-crystalline fluoropolymer.

3. The optical film according to claim 2, wherein the color tone correcting layer (3) further contains a colorant which has a near infrared ray absorption property.

4. The optical film according to claim 3, wherein the non-crystalline fluoropolymer is a polymer having a fluorine-containing alicyclic structure.

5. The optical film according to claim 2, wherein the non-crystalline fluoropolymer is a polymer having a fluorine-containing alicyclic structure.

6. The optical film according to claim 1, wherein the color tone correcting layer (3) further contains a colorant which has a near infrared ray absorption property.

7. An image display device comprising the optical film according to claim 1, wherein the optical film is present on a display surface thereof.

TABLE 3

| | Evaluation of optical film | | Evaluation of transparent resin layer | | | |
|---|---|---|---|---|---|---|
| | Reflectance | Scratch resistance (Haze value increase) | Self-healing property | UV irradiation dose (mj/cm2) | Cure shrinkage ratio | Evaluation of colorant Difference in transmittance |
| Example 1 | 0.5% | 1.2% | 100 g | 600 | 6% | 2% |
| Example 2 | 0.5% | 1.5% | 95 g | 600 | 7% | 2% |
| Example 3 | 0.5% | 1.2% | 100 g | 600 | 10% | 2% |
| Example 4 | 0.5% | 1.2% | 100 g | 600 | 6% | 2% |
| Example 5 | 0.4% | 1.2% | 100 g | 700 | 6% | 2% |
| Example 6 | 0.4% | 1.2% | 100 g | 700 | 6% | 2% |
| Comparative Example 1 | 0.5% | 1.3% | 100 g | 1200 | 6% | 14% |
| Comparative Example 2 | 0.5% | 1.2% | 100 g | — | 5% | 6% |

As shown in Table 3, the reflectance and scratch resistance of the optical film were good in all Examples. In Comparative Example 1, a large amount of ultraviolet ray irradiation was required to cure the transparent resin layer, and the deterioration of the colorant was significant. In Comparative Example 2 wherein a thermosetting urethane resin was used, not only it took very long time to form the transparent resin layer, but the deterioration of the colorant was also significant.

8. The optical film according to claim 1, wherein the self-healing property of the transparent resin layer is a value of at least 30 g measured as the maximum load measured by a HEIDON scratch tester, with which scratches formed with a diamond chip scratcher having a tip diameter of 15 μm can disappear at 23° C. and a relative humidity of 50%.

9. The optical film according to claim 1, wherein the transparent resin layer is obtained by photocuring a photocurable resin composition on the color tone correcting layer.

10. An optical film which comprises a transparent resin layer (1) made of a photocured photo-curable urethane resin having a self-healing property, an antireflection layer (2) present on one side of the transparent resin layer (1) and having a thickness from 10 to 500 nm, and a color tone correcting layer (3) containing a colorant which has a color tone correcting property, present on the other side of the transparent resin layer (1) opposite from the antireflection layer (2), wherein an interlayer having a refractive index higher than that of the transparent resin layer (1), is present between the transparent resin layer (1) and the antireflection layer (2).

11. The optical film according to claim 10, wherein the antireflection layer (2) is made of a non-crystalline fluoropolymer.

12. The optical film according to claim 11, wherein the color tone correcting layer (3) further contains a colorant which has a near infrared ray absorption property.

13. The optical film according to claim 12, wherein the non-crystalline fluoropolymer is a polymer having a fluorine-containing alicyclic structure.

14. The optical film according to claim 11, wherein the non-crystalline fluoropolymer is a polymer having a fluorine-containing alicyclic structure.

15. The optical film according to claim 10, wherein the color tone correcting layer (3) further contains a colorant which has a near infrared ray absorption property.

16. The optical film according to claim 10, wherein the self-healing property of the transparent resin layer is a value of at least 30 g measured as the maximum load measured by a HEIDON scratch tester, with which scratches formed with a diamond chip scratcher having a tip diameter of 15 μm can disappear at 23° C. and a relative humidity of 50%.

17. The optical film according to claim 10, wherein the first layer is obtained by photocuring a photo-curable resin composition on the color tone correcting layer.

* * * * *